(12) United States Patent
Kroeger

(10) Patent No.: US 7,305,056 B2
(45) Date of Patent: Dec. 4, 2007

(54) COHERENT TRACKING FOR FM IN-BAND ON-CHANNEL RECEIVERS

(75) Inventor: Brian William Kroeger, Sykesville, MD (US)

(73) Assignee: iBiquity Digital Corporation, Columbia, MD (US)

( * ) Notice: Subject to any disclaimer, the term of this patent is extended or adjusted under 35 U.S.C. 154(b) by 806 days.

(21) Appl. No.: 10/715,582

(22) Filed: Nov. 18, 2003

(65) Prior Publication Data

US 2005/0107045 A1 May 19, 2005

(51) Int. Cl.
*H04L 1/00* (2006.01)

(52) U.S. Cl. .................................... 375/348

(58) Field of Classification Search ............ 375/348, 375/326, 345, 260, 285; 455/83, 63.1, 67.13, 455/218

See application file for complete search history.

(56) References Cited

U.S. PATENT DOCUMENTS

| | | | |
|---|---|---|---|
| 3,833,741 A * | 9/1974 | Katz et al. ................. | 426/94 |
| 4,155,041 A * | 5/1979 | Burns et al. ............... | 455/501 |
| 5,323,421 A | 6/1994 | LaRosa et al. | |
| 5,465,411 A | 11/1995 | Koike | |
| 5,499,397 A | 3/1996 | Wadin et al. | |
| 5,561,673 A | 10/1996 | Takai et al. | |
| 5,940,454 A | 8/1999 | McNicol et al. | |
| 6,018,651 A | 1/2000 | Bruckert et al. | |
| 6,023,615 A | 2/2000 | Bruckert et al. | |
| 6,317,470 B1 | 11/2001 | Kroeger et al. | |
| 6,327,481 B1 | 12/2001 | Nagashima | |
| 6,490,007 B1 | 12/2002 | Bouillet et al. | |
| 6,539,063 B1 | 3/2003 | Peyla et al. | |
| 6,549,544 B1 | 4/2003 | Kroeger et al. | |
| 6,628,733 B1 | 9/2003 | Tomiyoshi et al. | |
| 6,633,258 B2 | 10/2003 | Lindenmeier et al. | |
| 2001/0031022 A1* | 10/2001 | Petrus et al. .............. | 375/324 |
| 2002/0037057 A1 | 3/2002 | Kroeger et al. | |
| 2002/0168955 A1 | 11/2002 | Wildhagen | |
| 2003/0026360 A1 | 2/2003 | Ramasubramanian et al. | |
| 2003/0137928 A1 | 7/2003 | Kroeger et al. | |

FOREIGN PATENT DOCUMENTS

EP 1047236 A1 10/2000

OTHER PUBLICATIONS

R. S. Blum et al., "An Adaptive Spatial Diversity Receiver For Non-Gaussian Interference and Noise," Signal Processing Advances in Wireless Communications, First IEEE Signal Processing Workshop on Signal Processing Advances in Wireless Communications, Paris, France, Apr. 16-18, 1997, pp. 385-388.

* cited by examiner

*Primary Examiner*—Khanh C. Tran
(74) *Attorney, Agent, or Firm*—Robert P. Lenart, Esq.; Pietragallo Bosick & Gordon, LLP

(57) ABSTRACT

A method for coherently tracking a radio signal including at least one digitally modulated reference carrier is provided, wherein the method comprises the steps of demodulating the reference carrier to produce complex coherent reference gains, detecting a transient that affects the complex coherent reference gains, and adjusting the complex coherent reference gains in the vicinity of the transient to produce adjusted complex coherent reference gains. The transient can be caused by switching among the antenna elements or impulsive noise. Receivers that process signals in accordance with the method, and a method of estimating noise variance of symbols in a radio signal are also provided.

25 Claims, 8 Drawing Sheets

US 7,305,056 B2

COHERENT TRACKING FOR FM IN-BAND ON-CHANNEL RECEIVERS

FIELD OF THE INVENTION

This invention relates to methods and apparatus for reception of radio signals, and more particularly to such methods and apparatus including a switch diversity antenna system.

BACKGROUND OF THE INVENTION

HD Radio is a medium for providing digital-quality audio, superior to existing analog broadcasting formats. The advantages of digital transmission for audio include better signal quality with less noise and wider dynamic range than with existing FM and AM radio. The goal of FM HD Radio is to provide virtual-CD quality stereo audio along with a capacity for a data channel. The development of new high-quality stereo codec algorithms indicates that virtual-CD stereo quality is practical at rates below 96 kbps. In-Band On-Channel (IBOC) HD Radio systems require no new spectral allocations because each digital signal is simultaneously transmitted within the spectral mask of an existing analog signal allocation. IBOC HD Radio is designed, through power level and spectral occupancy, to be transparent to the analog radio listener. IBOC HD Radio promotes economy of spectrum while enabling broadcasters to supply digital quality audio to their present base of listeners.

IBOC HD Radio is transmitted using a composite signal that includes a plurality of OFDM subcarriers and reference subcarriers with the broadcast channel. Coherent demodulation is used for the digital portion of an FM IBOC (In-Band On-Channel) signal in IBOC HD Radio receivers. The multiple roles of the Reference Subcarriers for acquisition, tracking, estimation of channel state information (CSI) and coherent operation have been described in U.S. Pat. No. 6,549,544, which is hereby incorporated by reference. The system described in U.S. Pat. No. 6,549,544 was designed for operation in the FM broadcast band (88-108 MHz) with fading bandwidth to accommodate receivers used in vehicles at highway speeds. The various coherent tracking parameters are estimated using filters with bandwidths that approximate the maximum expected Doppler bandwidth (roughly 13 Hz). With a fixed antenna, the pertinent tracking statistics of the input signal to the tracking algorithms are assumed to vary at a rate no greater than the Doppler bandwidth.

IBOC HD Radio receivers can be used in combination with a switch diversity antenna system. The switch diversity antenna system includes multiple antenna elements (e.g., 2 to 4) usually placed within the glass of the front or back windows of a vehicle. These elements are connected to a diversity switch module which dynamically selects one or a combination of elements to provide an RF antenna signal to the receiver. The diversity switch module also monitors a signal from the receiver to determine when to switch. A typical module's "blind switching" algorithm establishes a switching threshold based on the average intermediate frequency (IF) signal level from the receiver. When the IF signal falls below the threshold, the switch blindly selects an alternative element with the expectation of yielding a better signal. If the new signal is above a threshold, then the switch maintains the new element selection. Otherwise, the diversity switch module selects an alternative element after a minimum amount of dwell time. This process continues with the switch module continually updating its threshold(s). An example of such an antenna switch diversity system is presented in H. Lindenmeier et al., "Diversity System for Receiving Digital Terrestrial and/or Satellite Radio Signals for Motor Vehicles", U.S. Pat. No. 6,633,258 B2, Oct. 14, 2003.

The theory behind the operation of the diversity switch algorithm is based on the different instantaneous fading conditions of the various antenna elements. Multipath fading results in the addition of multiple rays (multipaths) of the signal arriving at the receiving antenna element at different times. For example a wavelength at 100 MHz is approximately 10 feet. If two signal paths arrive at a time differential of 1 wavelength or 10 nanoseconds (10 feet propagation difference), then the signals will add in-phase. Similarly if the two rays arrive at the antenna element with a time differential of a half wavelength, then the added out-of-phase signals will cancel. This addition or cancellation is dynamic in a moving vehicle where the Doppler bandwidth is approximated by $BW=f_c*s/c$ ($f_c$ is the carrier frequency, s is the speed of the vehicle, and c is the speed of light). The Doppler bandwidth is roughly 10 Hz at typical highway speeds. Therefore the signal vector (complex version of magnitude/phase) of one antenna element can vary at a rate of approximately 10 Hz in this example. Then coherent tracking of the reference signal and channel state must accommodate a 10 Hz bandwidth to maintain coherent signal tracking.

Typical antenna elements in a vehicle can experience somewhat independent instantaneous fading conditions (depending on spacing of the elements and the directions of the multiple paths). For example one element can be in a fading null while another element is at a maximum. In a vehicle with several elements, it is likely that an antenna element will receive a sufficiently higher signal while the present element is experiencing a fade (signal cancellation). Typical elements in a multi-element FM diversity antenna system will have instantaneous fading conditions that may be somewhat correlated, but sufficiently uncorrelated to achieve the desired diversity gain to improve performance.

The coherent digital modem in an example IBOC HD Radio receiver is designed to track signal fading at vehicle speeds where Doppler bandwidth is <13 Hz. The use of switch diversity antennas in vehicle windows introduces abrupt transients in the coherent tracking of the digital signal, which degrades digital performance. The transients caused by dynamic antenna switching cannot be tracked in the previous receiver modem resulting in degraded digital coverage.

This invention provides a coherent tracking method which accommodates the switching transients in a switch diversity antenna system.

SUMMARY OF THE INVENTION

A method for coherently tracking a radio signal including at least one digitally modulated reference carrier is provided, wherein the method comprises the steps of demodulating the reference carrier to produce complex coherent reference gains, detecting a transient that affects the complex coherent reference gains, and adjusting the complex coherent reference gains in the vicinity of the transient to produce adjusted complex coherent reference gains. The transient can be caused by switching among the antenna elements or impulsive noise.

The invention also encompasses a receiver for coherently tracking a radio signal including at least one digitally modulated reference carrier, wherein the receiver comprises an input for receiving the radio signal; and a processor for demodulating the reference carrier to produce complex coherent reference gains, for detecting a transient that affects the complex coherent reference gains, and for adjusting the complex coherent reference gains in the vicinity of the transient to produce adjusted complex coherent reference gains.

In another aspect, the invention provides a method of estimating noise variance of symbols in a radio signal when noise can include impulsive-like samples among Gaussian-like noise samples, wherein the method comprising the steps of adding input samples and coherent reference samples to produce error samples, computing the squares of the error samples, separating squared Gaussian-like noise samples and squared impulsive noise samples, and nonlinear filtering of the squares of the error samples to produce a noise variance estimate representing the sum of long-term-averaged Gaussian-like noise variance, and short-term impulsive noise variance.

DETAILED DESCRIPTION OF THE INVENTION

Figure 1:
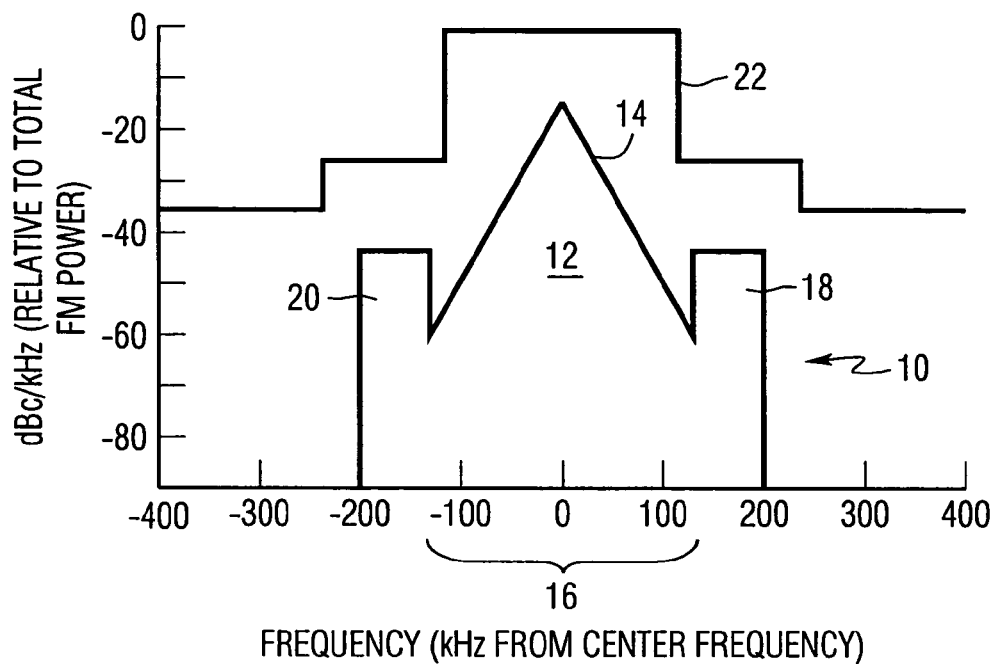
FIG. 1 is a schematic representation of the frequency allocations and relative power spectral density of the signal components for a hybrid FM IBOC HD Radio signal.

Referring to the drawings, FIG. 1 is a schematic representation of the frequency allocations and relative power spectral density of the signal components for a hybrid FM IBOC HD Radio signal. The hybrid format includes the conventional FM stereo analog signal 12 having a power spectral density represented by the triangular shape 14 positioned in a central frequency band 16 portion of the channel. The Power Spectral Density (PSD) of a typical analog FM broadcast signal is nearly triangular with a slope of about −0.35 dB/kHz from the center frequency. A plurality of digitally modulated evenly spaced subcarriers are positioned on either side of the analog FM signal, in an upper sideband 18 and a lower sideband 20, and are transmitted concurrently with the analog FM signal. All of the carriers are transmitted at a power level that falls within the United States Federal Communications Commission channel mask 22. The vertical axis in FIG. 1 shows the peak power spectral density as opposed to a more conventional average power spectral density characterization.

Figure 2:
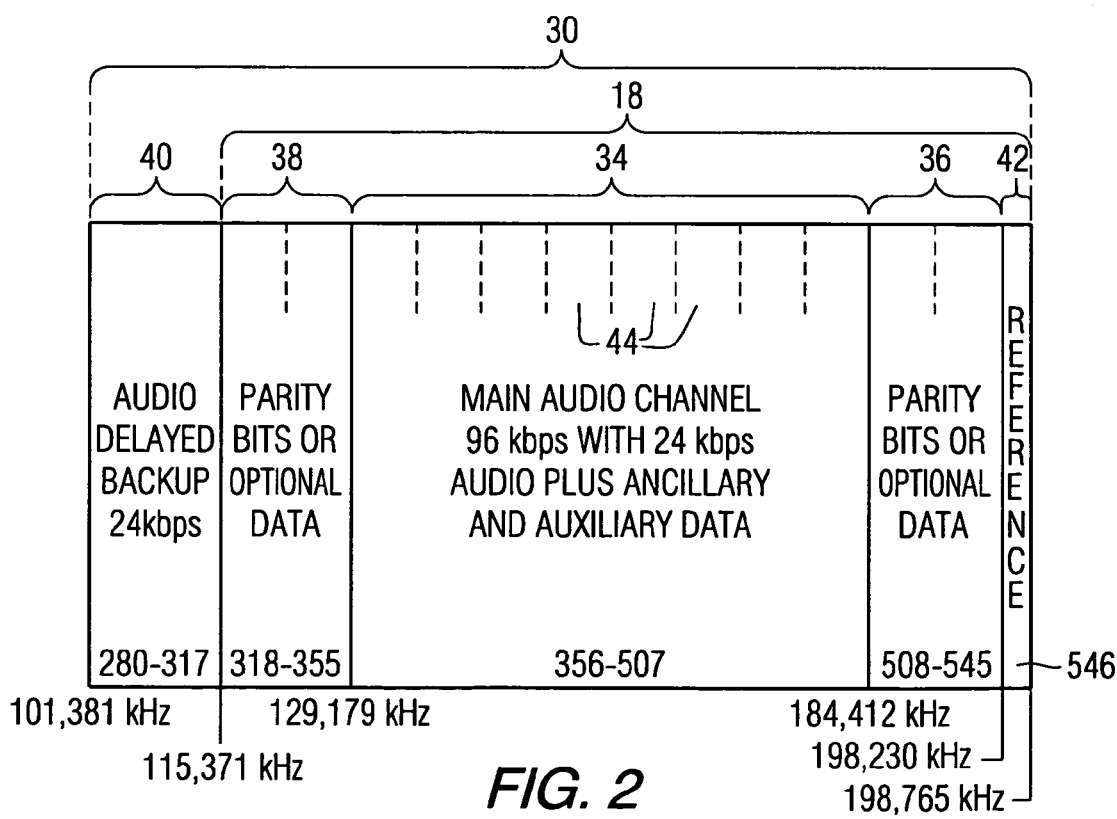
FIG. 2 is a schematic representation of the frequency allocations for the upper sideband of the FM IBOC HD Radio signal.

FIG. 2 is a schematic representation of the frequency allocations for the upper sideband of the FM IBOC HD Radio signal. The upper sideband 30 represented in FIG. 2, is comprised of information-bearing subcarriers 280 through 546 corresponding to subcarrier frequencies 101,381 Hz through 198,765 Hz. Subcarrier 546 is a reference subcarrier. The upper sideband is shown to be divided into several groups 34, 36, 38 and 40. Group 34 represents the main channel and contains subcarriers 356 through 507. The main channel subcarriers are used to transmit the program material to be broadcast in the form of data bits of the coding algorithm at a rate of at least 96 thousand bits per second (kbps). The main channel may include ancillary and auxiliary data. A second group of carriers 36 occupying subcarrier positions 508 through 545 are used to transmit parity bits. These subcarriers are more likely to be corrupted by interferers than subcarriers that are positioned closer to the center of the channel. The most expendable code bits are placed on the outer OFDM subcarriers. The expendable bits contribute least to the free distance or coding gain of the combined code and they are least important to the error correction ability of the code. Therefore, the most vulnerable subcarriers are used to carry these expendable bits.

Another group of subcarriers 38 is used in the all-digital signal, wherein the analog signal has been removed, to carry parity bits or optional data. This group of subcarriers may be used in the hybrid embodiment, if the analog signal in the central frequency band is scaled back, for example by removing stereo information. Subcarrier group 40 includes subcarrier positions 280 through 317 and is used in the all-digital signal to transmit a delayed backup version of the program material at a lower data rate, of for example 24 kbps. The subcarriers in this group would not be used in the hybrid embodiment unless the analog base band signal is further scaled back. In the all-digital embodiment, the subcarriers of group 40 provide data that can be used in the event of a loss of the signal transmitted in the main channel. The subcarrier at location 546 represents a reference signal 42. The subcarriers in the upper HD Radio sideband are partitioned into groups 44 of 19 subcarriers each, with subcarrier 0 of each group being a reference subcarrier.

Figure 3:
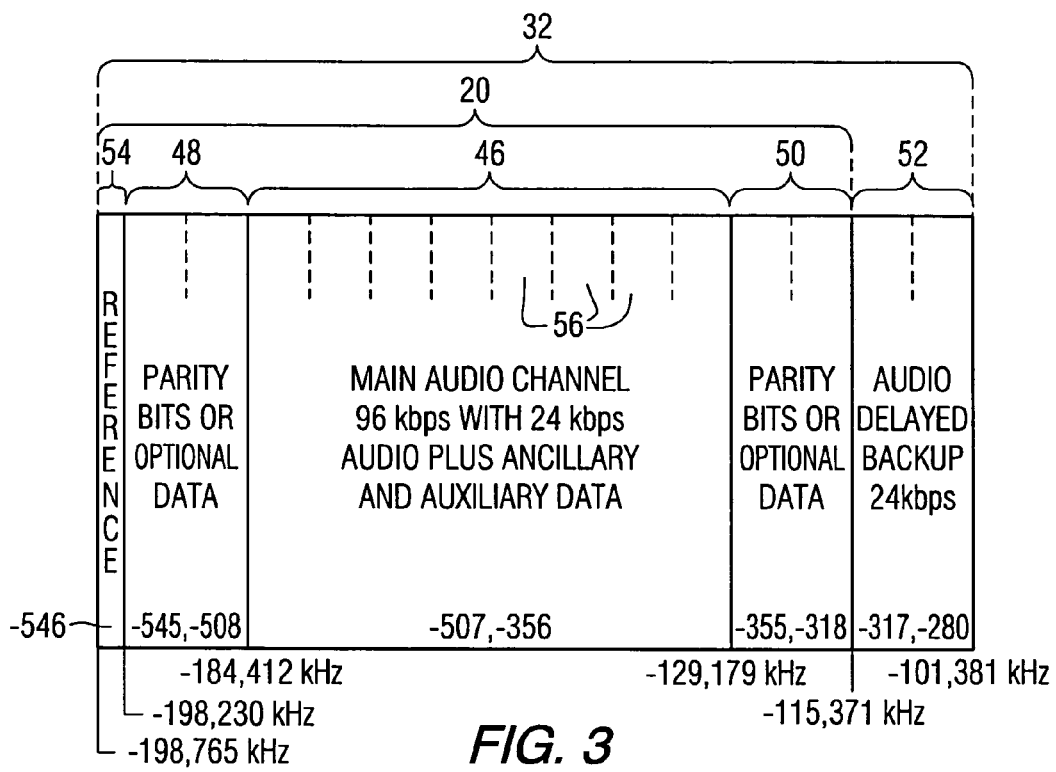
FIG. 3 is a schematic representation of the frequency allocations for the lower sideband of the FM IBOC HD Radio signal.

The subcarrier placement in the lower sideband shown in FIG. 3, represents a mirror image of the subcarrier placement in the upper sideband format with negative indexes and frequencies. Lower sideband main channel 46 contains the subcarriers at locations −356 through −507 and is used to transmit the same program material as is transmitted in the upper sideband main channel, but using punctured convolutional coding that is complementary to that used in the upper HD Radio sideband. The subcarriers in groups 48, 50 and 52 are utilized in the same manner as the subcarriers of groups 36, 38 and 40 of the upper sideband. The subcarrier in position −546 may be used to transmit a reference signal 54. The subcarriers in the lower HD Radio sideband are partitioned into groups 56 of 19 subcarriers each, with subcarrier 0 of each group being a reference subcarrier.

One example Hybrid FM system has 191 subcarriers above and 191 below the host FM spectrum. Each digital subcarrier is QPSK modulated. The inphase and quadrature pulse shapes are root raised cosine tapered at the edges to suppress the spectral sidelobes. In one FM Hybrid broadcast mode, 191 OFDM subcarriers are placed on each side of the host FM signal occupying the spectrum from about 129 kHz through 199 kHz away from the host FM center frequency as shown in FIG. 1.

The total digital power in each sideband is set to about −23 dB relative to its host FM power. The individual OFDM subcarriers are QPSK modulated at 344.53125 Hz (44100/128) and are orthogonally spaced at about 363.3728 Hz (44100*135/8192) after pulse shaping is applied (root raised cosine time pulse with 7/128 excess time functions as guard time). The potential subcarrier locations are indexed from zero at the FM center frequency to plus or minus 550 at the edges of the 400 kHz bandwidth. The outside assigned subcarriers are at plus or minus 546 with a center frequency of plus or minus 198402 Hz. The inside information bearing subcarriers of the example system are located at plus or minus 356 with center frequencies of plus or minus 129361 Hz. Reference Subcarriers are spaced 19 subcarriers apart starting from location 356 through 546 on either sideband. These Reference Subcarriers are used to establish a phase reference for coherent detection of the other information-bearing subcarriers. The Reference Subcarriers are also used for Frame Synchronization and channel state information (CSI) estimation.

Subcarriers 356 through 507 carry about 96 kbps of information. Subcarriers 508 through 545 can carry an additional 24 kbps of information bits to create an effective code rate of R=4/5 on each side of the FM signal. The placement of digital subcarriers at ±15 kHz about 114 kHz is avoided in the baseline system in order to reduce the noise introduced into inadequately filtered receivers. However the broadcaster will have the option to utilize this portion of the spectrum to improve robustness of the digital audio signal and/or to provide additional datacasting capacity. This option is attractive if the broadcaster avoids stereo operation of the FM signal.

In the presence of adjacent channel interference, the outer OFDM subcarriers are most vulnerable to corruption, and the interference on the upper and lower sidebands is independent. Since the PSD of an FM broadcast signal is nearly triangular, the interference increases as the OFDM subcarriers approach the frequency of a first adjacent signal. The coding and interleaving can be specially tailored to deal with nonuniform interference such that the communication of information is robust.

The system will transmit all the digital audio information on each digital sideband (upper or lower) of the FM carrier. The baseline Hybrid FM system employs a code rate of 2/5. Each sideband can be detected and decoded independently with an FEC coding gain achieved by a rate 4/5 convolutional code. Further error detection capability is provided with an 8-bit CRC on each audio or data field. The dual sideband redundancy permits operation on one sideband while the other is completely corrupted. However, usually both sides are combined to provide additional signal power and coding gain. Special techniques can be employed to demodulate and separate strong first adjacent interferers such that "recovered" digital sidebands can be successfully combined to tolerate large first adjacent interferers.

The Reference Subcarriers are modulated with a repeating 32-bit BPSK Timing Sequence, which is differentially encoded prior to transmission. The Reference Subcarriers serve multiple purposes including: 1) resolution of subcarrier ambiguity on acquisition, 2) local phase reference for subsequent coherent detection, 3) local noise and/or interference samples for estimation of Channel State Information (CSI), and 4) phase error information for frequency and symbol tracking. Differential coding of the BPSK Timing Sequence permits detection of the BPSK Timing Sequence prior to establishment of the coherent reference needed for the remaining subcarriers. The differentially detected pattern is then used to remove the data modulation from the Reference Subcarriers, leaving information about the local phase of the reference as well as noise or interference samples. This is used to estimate the CSI needed for subsequent soft decision decoding.

Figure 4:
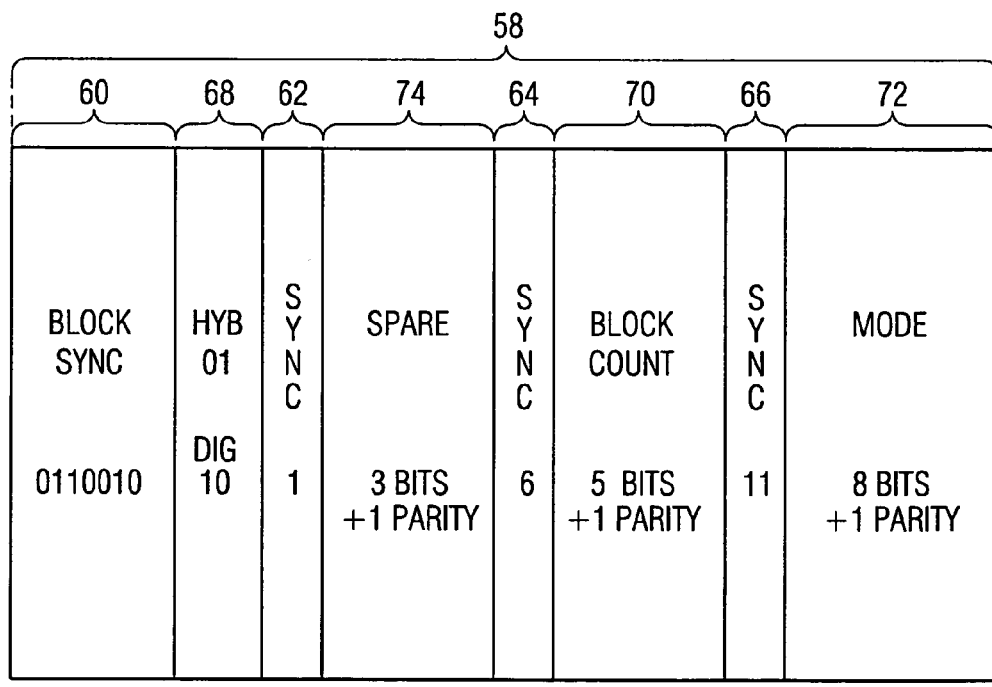
FIG. 4 is a schematic representation of BPSK timing sequence used in the FM IBOC HD Radio signal.

The BPSK Timing Sequence 58 (prior to differential coding) is shown in FIG. 4. The BPSK timing sequence of FIG. 4 uses a 32 bit timing sequence. Eleven of the 32 bits are fixed for block synchronization purposes. A block synchronization word (or pattern) is placed in non-contiguous fields 60, 62, 64 and 66. Field 60 includes seven bits, fields 62 and 64 each include one bit, and field 66 includes two bits. The 11 bits of the block synchronization pattern are sufficient for uniquely defining the boundaries of each block, regardless of the values of the remaining 21 bits. The block synchronization pattern uniquely defines the block boundaries. The timing sequence also includes a hybrid/digital field 68, a block count field 70, a mode field 72 and a spare field 74. The block count field can accommodate a modem frame size of up to 32 blocks. The mode field can accommodate up to 256 modes. The four variable fields in the BPSK timing sequence (hybrid/digital, spare, block count, and mode) are parity checked for both error protection and to eliminate phase reference changes at the end of each variable field due to differential encoding. The same BPSK timing is imposed on all reference subcarriers.

The differentially encoded BPSK Timing Sequence is mapped onto the QPSK reference subcarriers by assigning a BPSK logic "1" (after differential encoding) to a QPSK bit pair "1,1", and a BPSK logic "0" (after differential encoding) to a QPSK bit pair "0,0". BPSK is chosen for the Reference Subcarrier since it is more tolerant of noise and channel impairments than differentially detected QPSK. Furthermore, the redundancy of the BPSK Timing Sequence over all Reference Subcarriers yields a robust reference even under the most severe interference and channel conditions. The Block Count field can accommodate a Modem Frame size of up to 32 Blocks. The Mode field can accommodate up to 256 modes. The 4 variable fields in the BPSK Timing Sequence (Hybrid/Digital, Spare, Block Count, and Mode) are parity checked for both error protection and to eliminate phase reference changes at the end of each variable field due to differential encoding. The same BPSK Timing Sequence is redundantly transmitted at all Reference Subcarrier locations and is coincident with the Block of an Interleaver defined in the Block Count field. Variations of the BPSK Timing Sequence have been considered to expand functionality such as identification of each particular reference subcarrier.

Figure 5:
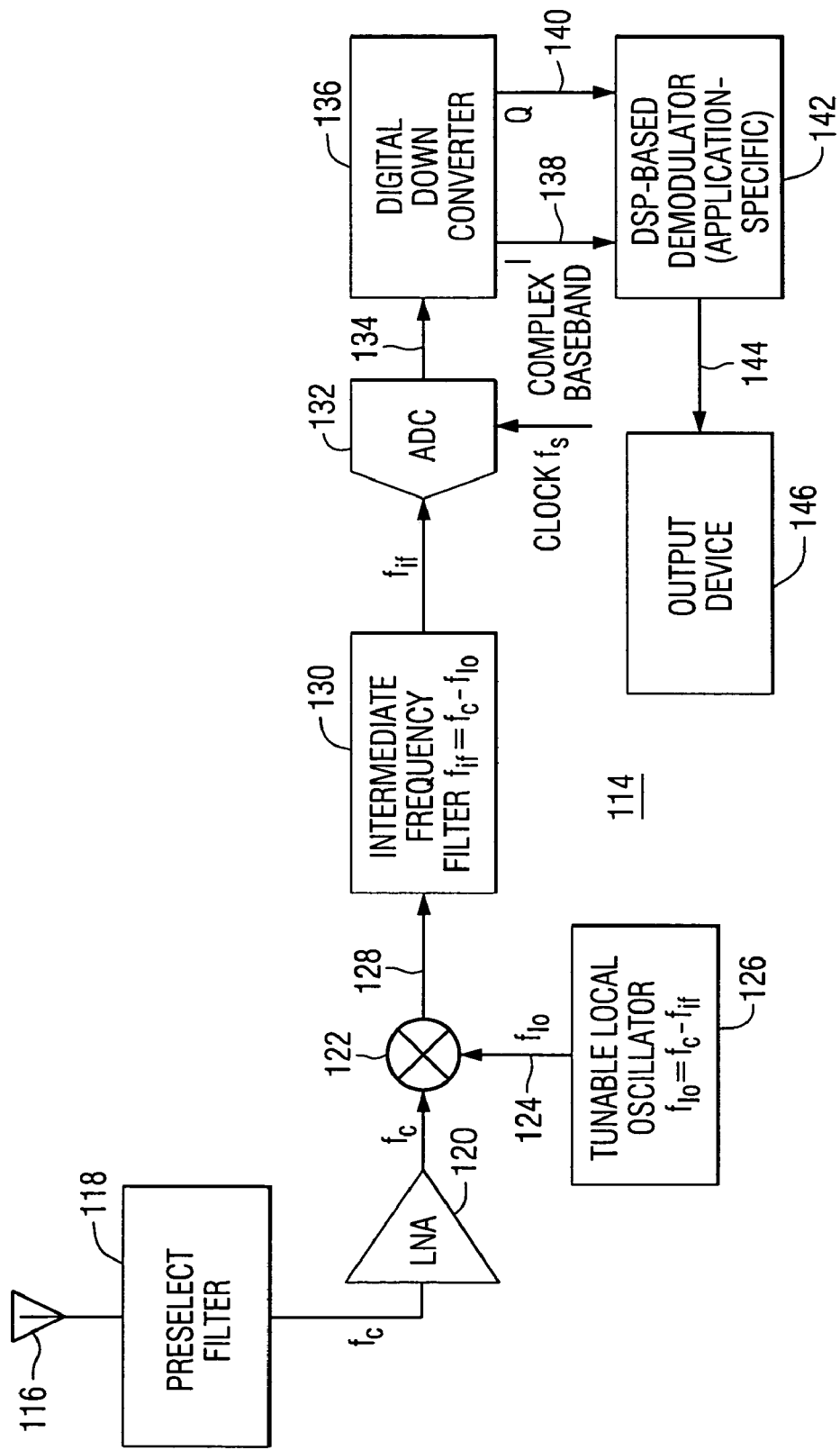
FIG. 5 is a functional block diagram of a receiver for use in a digital audio broadcasting system that can process signals in accordance with this invention.

FIG. 5 is a block diagram of a radio receiver 114 capable of performing the signal processing in accordance with this invention. The HD Radio signal is received on antenna 116. A bandpass preselect filter 118 passes the frequency band of interest, including the desired signal at frequency $f_c$, but rejects the image signal at $(f_c-2f_{if})$ (for a low sideband injection local oscillator). Low noise amplifier 120 amplifies the signal. The amplified signal is mixed in mixer 122 with a local oscillator signal $f_{lo}$ supplied on line 124 by a tunable local oscillator 126. This creates sum $(f_c+f_{lo})$ and difference $(f_c-f_{lo})$ signals on line 128. Intermediate frequency filter 130 passes the intermediate frequency signal $f_{if}$ and attenuates frequencies outside of the bandwidth of the modulated signal of interest. An analog-to-digital converter 132 operates using a clock signal $f_s$ to produce digital samples on line 134 at a rate $f_s$. Digital down converter 136 frequency shifts, filters and decimates the signal to produce lower sample rate in-phase and quadrature signals on lines 138 and 140. A digital signal processor based demodulator 142 then provides additional signal processing to produce an output signal on line 144 for output device 146.

Soft-decision Viterbi decoding with weighting for maximum ratio combining (MRC) for coherently detected QPSK subcarrier symbols is employed to minimize losses over the channel. Since the interference and signal levels vary over the subcarriers (frequency) and time due to selective fading, timely CSI is needed to adaptively adjust the weighting for the soft-symbols used as branch metrics in the Viterbi decoding. The CSI estimation technique should be designed to accommodate a fading bandwidth of up to about 13 Hz for maximum vehicle speeds in the FM band around 100 MHz. A delay spread of several microseconds is typical, although larger spreads have been measured in some environments. The technique for estimating both the phase reference and the CSI from the Reference Subcarriers is illustrated in FIG. 6.

Figure 6:
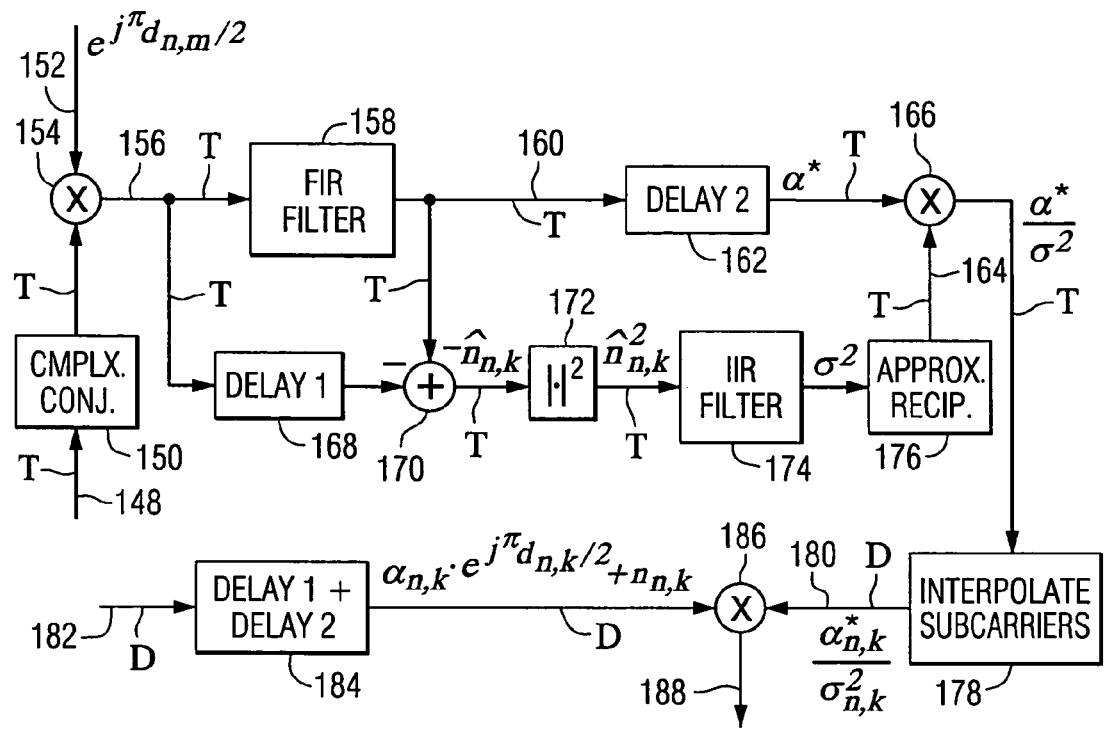
FIG. 6 is a block diagram showing the channel state estimation technique used in the receiver of FIG. 5.

As shown in FIG. 6, the complex training symbols carried by the reference subcarriers are input on line 148 and the complex conjugate of the symbols is taken as shown in block 150. The complex conjugate is multiplied with a known training sequence on line 152 by multiplier 154. This removes the binary (±1) timing sequence modulation from the received training subcarriers by multiplying them by the synchronized, decoded, and differentially-reencoded BPSK timing sequence. The resulting symbols on line 156 are processed by a finite impulse response (FIR) filter 158 to smooth the resulting symbols over time, yielding a complex conjugated estimate of the local phase and amplitude on line 160. This value is delayed by time delay 162 and multiplied by an estimate of the reciprocal of the noise variance on line 164 by multiplier 166. The noise variance is estimated by subtracting the smoothed estimate of the local phase and amplitude on line 160 from the input symbols (after appropriate time alignment provided by delay 168) at summation point 170. Then squaring the result as shown in block 172, and filtering the complex noise samples as illustrated in block 174. The reciprocal is approximated (with divide-by-zero protection) as shown in block 176. This CSI weight is interpolated over the 18 subcarriers between pairs of adjacent training subcarriers as illustrated by block 178 to produce resulting local CSI weights on line 180. The CSI weights are then used to multiply the corresponding local data-bearing symbols received on line 182, after they have been appropriately delayed as shown in block 184. Multiplier 186 then produces the soft decision output on line 188.

In FIG. 6, lines carrying training symbols are labeled T and lines carrying data are labeled D. In addition, filter 174 includes a delay of:

$$\text{delay} \geq \frac{1}{\beta}, \text{ where } \beta = \frac{1}{16}$$

and, $$y_{n,m}=2\cdot(1-\beta)\cdot y_{n-1,m}-(1-\beta)^2\cdot y_{n-2,m}+\beta^2\cdot x$$

These expressions relate to a 2-pole IIR filter with a time constant $\beta$. The IIR filter computes smoothed output samples "y" from input sample "x" and previous output samples.

The CSI weight combines the amplitude weighting for maximum ration combining (MRC) along with a phase correction for channel phase errors. This CSI weight is dynamic over time and frequency, and is estimated for each QPSK symbol.

$$CSIweight = \frac{\hat{\alpha}^*}{\hat{\sigma}^2},$$

where $\hat{\alpha}^*$ is an estimate of the complex conjugate of the channel gain and $\hat{\sigma}^2$ is an estimate of the variance of the noise.

The operation of the CSI recovery technique of FIG. 6 assumes acquisition and tracking of the frequency of the subcarriers, and the symbol timing of the OFDM symbols. The frequency and symbol timing acquisition techniques exploit properties of the cyclic prefix. The frequency and symbol tracking is accomplished through observation of the phase drift from symbol to symbol over time or frequency (across subcarriers).

After acquisition of both frequency and symbol timing, synchronization to the Block Sync pattern of the BPSK Timing Sequence is attempted by crosscorrelating the differentially detected BPSK sequence with the Block Sync pattern. The differential detection is performed over all subcarriers assuming that the location of the training subcarriers is initially unknown. A crosscorrelation of the known Block Sync pattern with the detected bits of each subcarrier is performed. A subcarrier correlation is declared when a match of all 11 bits of the Block Sync pattern is detected. Block synchronization (and subcarrier ambiguity resolution) is established when the number of subcarrier correlations meets or exceeds the threshold criteria (e.g., 4 subcarrier correlations spaced a multiple of 19 subcarriers apart).

After Block Sync is established the variable fields in the BPSK Timing Sequence can be decoded. The differentially detected bits of these variable fields are decided on a majority vote basis across the training subcarriers such that decoding is possible when some of these subcarriers or bits are corrupted. The 16 Blocks within each Modem Frame are numbered sequentially from 0 to 15. Then the most significant bit (MSB) of the Block Count field is always set to zero since the Block Count never exceeds 15. Modem Frame synchronization is established with knowledge of the Block Count field.

The coherent detection of this signal requires a coherent phase reference. The decoded information from the BPSK Timing Sequence is used to remove the modulation from the training subcarriers leaving information about the local phase reference and noise. Referring to FIG. 6, the binary (±1) timing sequence modulation is first removed from the received training subcarriers by multiplying them by the synchronized, decoded, and differentially-reencoded BPSK Timing Sequence. A FIR filter is used to smooth the resulting symbols over time, yielding a complex conjugated estimate of the local phase and amplitude. This value is delayed and multiplied by an estimate of the reciprocal of the noise variance. The noise variance is estimated by subtracting the smoothed estimate of the local phase and amplitude from the input symbols (after appropriate time alignment), squaring and filtering the complex noise samples, then approximating the reciprocal (with divide-by-zero protection). This CSI weight is interpolated over the 18 subcarriers between pairs of adjacent training subcarriers. The resulting local CSI weights are then used to multiply the corresponding local data-bearing symbols.

In one embodiment, the low pass filter 158 in FIG. 6 is an 11-tap FIR filter. The 11-tap FIR filter is used to dynamically estimate the complex coherent reference gain $\alpha$ at each reference subcarrier location for each symbol time. The filtering over time with the 11-tap FIR filter, and subsequent filtering across subcarriers is performed to compute a local estimate of the coherent reference gain a for each QPSK symbol location over both time and frequency. A larger FIR filter with more taps would reduce the estimation error when the signal statistics are stationary, but the bandwidth would be too small to track Doppler-induced changes in the signal at maximum highway speeds. Therefore 11 taps with a tapered symmetric Gaussian-like impulse response is appropriate. A symmetric FIR is used instead of an IIR filter for its linear phase property which has zero bias error for a piecewise linear (approximately) channel fading characteristic over the span of the filter. This smoothed coherent reference signal output of the FIR filter is subtracted from the delayed input samples to yield the instantaneous noise samples. These noise samples are squared and processed by an IIR filter 174 to yield an estimate of the noise variance $\sigma^2$. This filter has a narrower bandwidth than the FIR filter to yield a generally more accurate estimate of the noise variance. After appropriate sample delays to match the filter delays, the symbol weight $\alpha^*/\sigma^2$ is computed for each subcarrier. These values are smoothed and interpolated across the subcarriers for each OFDM symbol to yield more accurate estimates. This weight is unique for each OFDM symbol and each subcarrier providing a local (time and frequency) estimate and weight for the symbols forming the branch metrics for a subsequent Viterbi decoder.

The system just described was designed to accommodate vehicles with fixed antennas. The multiple roles of the Reference Subcarriers for acquisition, tracking, estimation of channel state information (CSI) and coherent operation have been described. The system was designed for coherent operation in the FM broadcast band (88-108 MHz) with fading bandwidth to accommodate vehicles at highway speeds. The various coherent tracking parameters are estimated using filters with bandwidths that approximate the maximum expected Doppler bandwidth (roughly 13 Hz). With a fixed antenna, the pertinent tracking statistics of the input signal to the tracking algorithms are assumed to vary at a rate no greater than the Doppler bandwidth.

IBOC HD Radio receivers can also be used in combination with switch diversity antenna systems. However the use of switch diversity antennas introduces abrupt transients in the coherent tracking of the digital signal, which degrades digital performance.

As used herein, the "complex coherent reference gain ($\alpha$)" of a QPSK symbol (depending on time/freq location since it is dynamic) is defined as $\alpha$. It is a complex term, including real and imaginary components, that represents the gain and phase of the symbol associated with it. This value is estimated by the processing and filtering described. The "composite coherent channel reference signal $x_n$," is the composite value of $\alpha$ as computed in FIG. 12 over all the reference subcarriers over any one OFDM symbol time.

Figure 7:
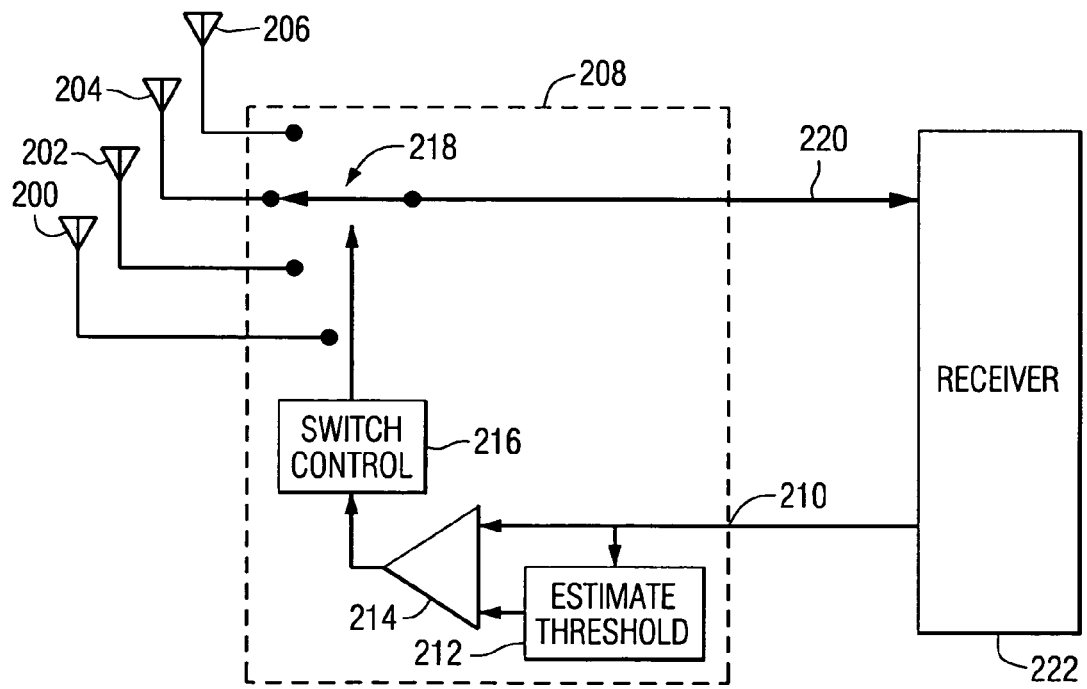
FIG. 7 is a functional diagram of switch diversity antenna system.
Figure 8:
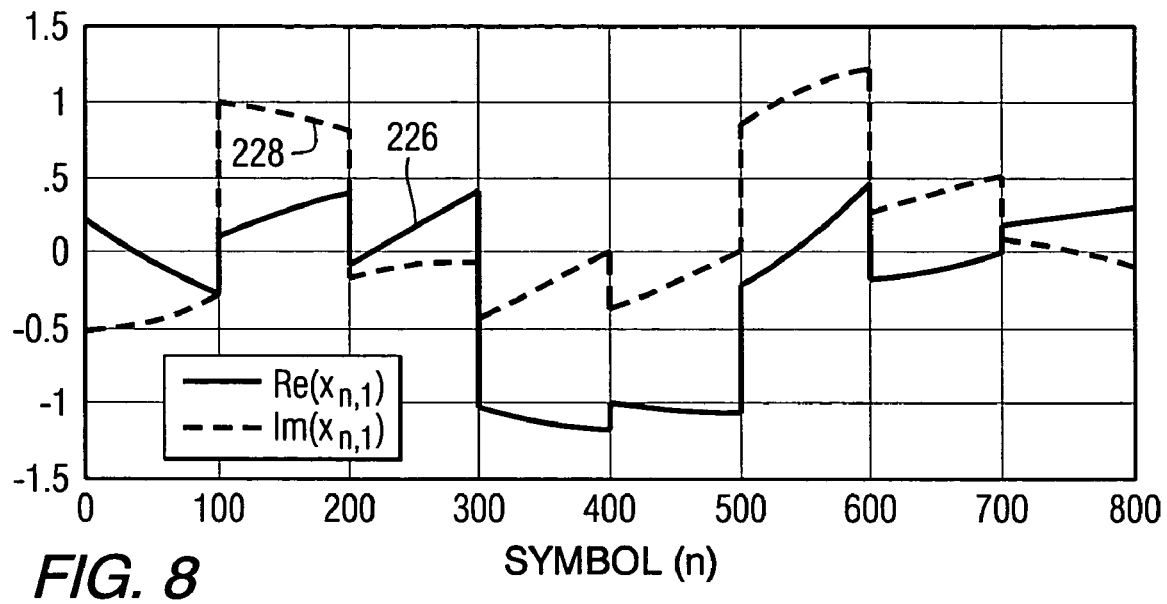
FIG. 8 is a plot of an example of a fading signal.

The switch diversity antenna system includes multiple antenna elements (e.g., 2 to 4) usually placed within the glass of the front or back windows of a vehicle. A functional diagram of the diversity switch configuration is shown in FIG. 7. Multiple elements 200, 202, 204 and 206 are connected to a diversity switch module 208. The diversity switch module includes an input 210 for receiving a control signal. The control signal is compared to an estimated threshold as shown in block 212 and the control signal and results of the comparison are input to an amplifier 214. A switch control 216 responds to the amplifier output to control an antenna switch 218. This connects one of the antennas to the antenna input 220 of the receiver. The diversity switch module dynamically selects one or a combination of elements to provide an RF antenna signal to the receiver. The diversity switch module monitors a signal from the receiver to determine when to switch. A plot of a sample fading signal where the antenna element is switched every 100 symbols is shown in FIG. 8, which shows the real and imaginary components of a (noiseless) fading signal switched every 100 symbols. Although this periodic switching does not accurately model the antenna switch diversity algorithm, it is used to illustrate the effects of the transients.

For this example it can be assumed that the switching time of a diversity switching module is on the order of 10 microseconds, while the minimum dwell time is on the order of 10 milliseconds. The switching time of 10 microseconds has no audible affect on the demodulated FM signal, but the overall FM diversity improvement can be substantial since signal fades are avoided. However the switching transient adversely affects the coherently-tracked digital signal. As shown in FIG. 8, the antenna module switching causes a step transient in the coherent signal, while the signal immediately before or after the transient is approximately coherent. FIR filtering across the step transient distorts the estimated coherent channel reference $\alpha$ (as shown in FIG. 6) affecting a span of samples equal to the FIR length (11 taps). This distortion in the coherent channel reference increases the magnitude of the noise samples from the subtraction of this reference from the input samples. Although the noise is increased in the vicinity of the transient, the IIR filter spreads out this noise peak over the span of the IIR filter. This has the effect of underestimating the noise variance in the immediate vicinity of the transient, while overestimating the noise variance over the time span of the IIR filter not in the immediate vicinity of the transient. Both the distorted coherent channel reference and the noise variance errors contribute to the degradation of the digital signal. This invention provides a coherent tracking method which accommodates the switching transients in the switch diversity antenna system.

Figure 9:
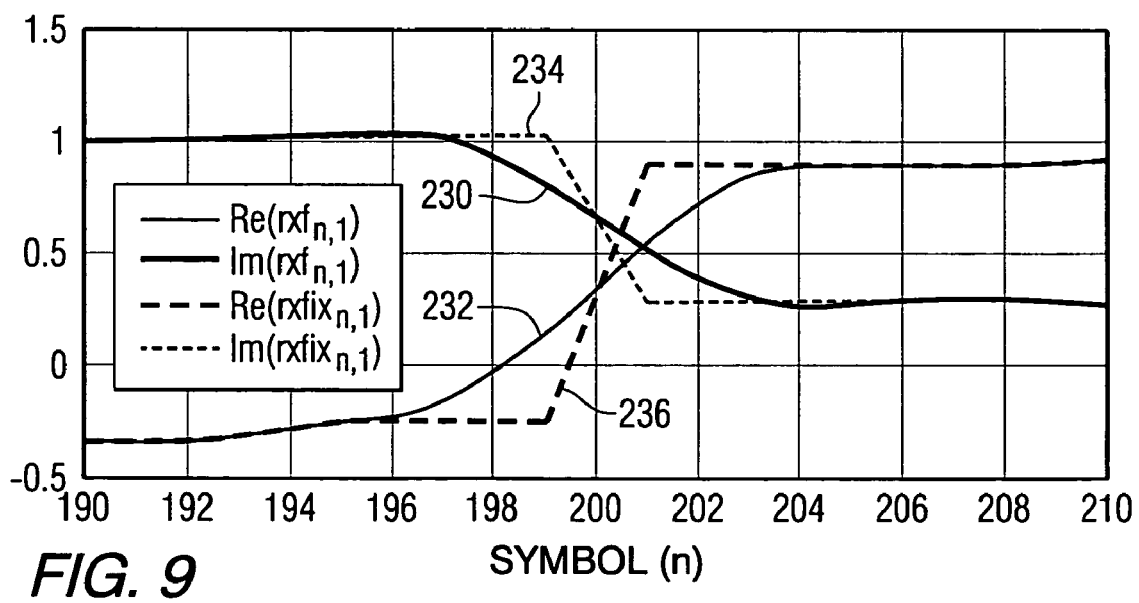
FIG. 9 is a plot of an example filtered coherent reference fading signal.

FIG. 9 shows the Real and Imaginary components of the filtered coherent reference fading signal switch in the vicinity of a transient at symbol 200 with 10 dB SNR. The solid lines 230 and 232 are the smoothed complex channel gain values ($\alpha$) and show the effect of the 11-tap FIR filter where the reference signal is distorted in the vicinity of the transient. The FIR filter has the effect of smoothly interpolating (distorting) the samples on either side of the switch transient. The dashed lines 234 and 236 show a better estimate of the coherent signal where only the symbol experiencing the transient is affected.

Figure 10:
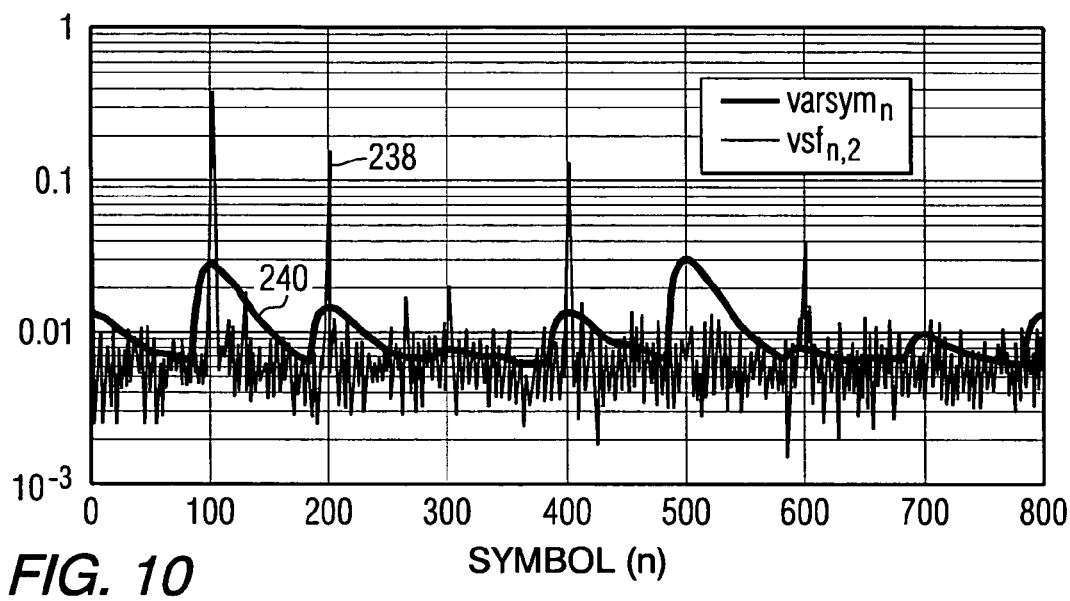
FIG. 10 is a plot showing the effects of switch transients on noise estimates.

FIG. 10 is a plot showing the effects of switch transients on the noise estimates (20 dB SNR). Line 238 is the noise sample input to the IIR filter and line 240 is the filtered output. The input noise samples (squared) are seen to increase in the immediate vicinity of the transient. This is actually due to the distortion of the coherent channel reference due to the 11-tap FIR filter. Although the IIR output responds to the noise peaks, these peaks are suppressed locally to, the transient, but spread over the duration of the IIR filter. These errors in the local noise variance estimation contribute to degraded digital performance.

Figure 11:
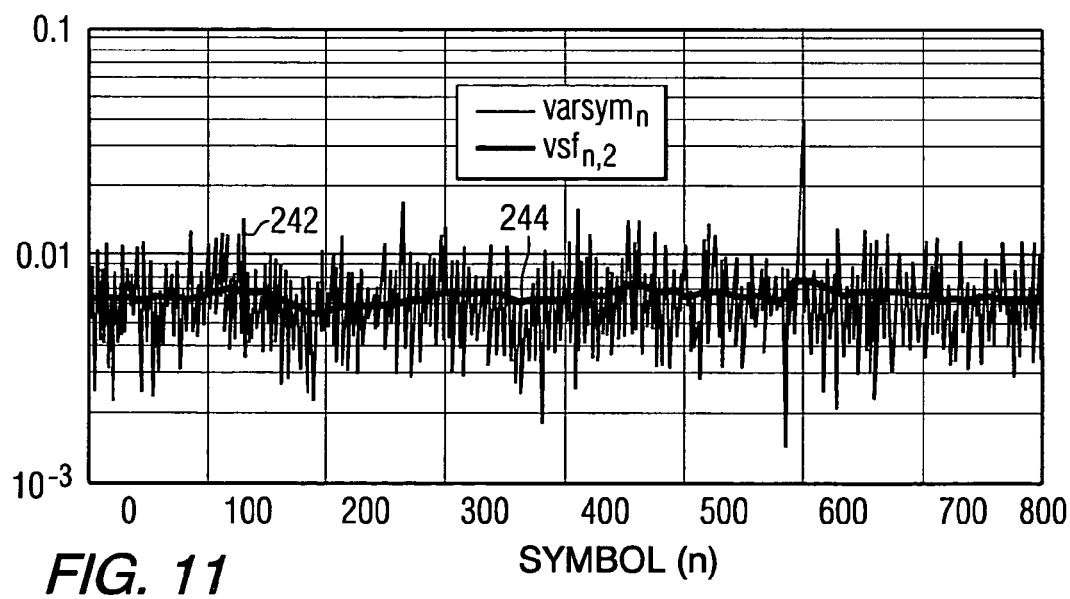
FIG. 11 is another plot showing the effects of switch transients on noise estimates.

FIG. 11 is a plot showing the effects of switch transients on the noise estimates (20 dB SNR) with the coherent reference having been fixed in accordance with the invention. Line 242 is the input to the IIR filter and line 244 is the filtered output. FIG. 11 shows the same scenario as FIG. 10. However, the coherent channel reference is corrected in accordance with this invention. Nothing was altered in the IIR filtering or noise variance estimation.

Figure 12:
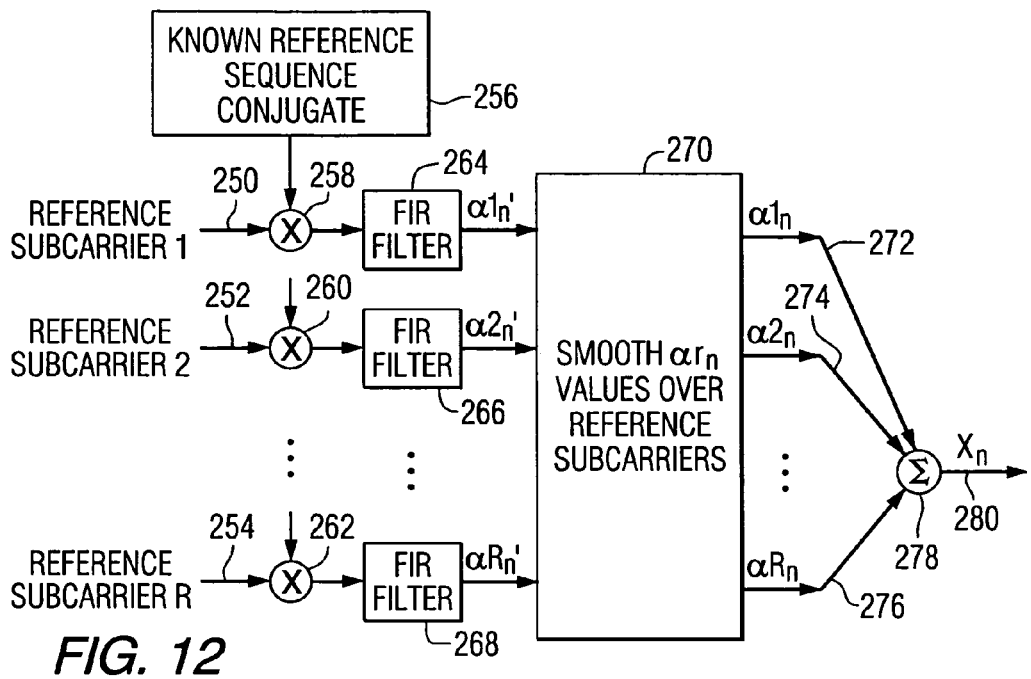
FIG. 12 is a functional block diagram illustrating the generation of coherent channel reference signals.

Coherent tracking can be achieved on either side (in time) of a switching transient as shown in FIG. 9. FIG. 12 is a functional block diagram illustrating the generation of coherent channel reference signals. Demodulated complex symbols from multiple reference subcarriers are input on lines 250, 252 and 254. These complex symbols are combined with known reference sequence conjugate 256 in mixers 258, 260 and 262 to remove data from the reference subcarrier symbols. HIR filters 264, 266 and 268 filter each complex subcarrier gain value to reduce noise. The FIR filters, can be, for example, 7-tap filters. Block 270 shows that the subcarrier gain values are smoothed over the reference subcarriers to further reduce noise in the estimate. This results in coherent channel reference gain for each subcarrier on lines 272, 274 and 276. These coherent channel reference gains are summed in summation point 278 to produce a composite coherent channel reference signal $x_n$ on line 280.

The coherent estimation filters cannot use signal samples that straddle the transient, so the tracking filters can use only signal samples up to (but not including) the transient from either time direction. The time location of the signal transient must be identified. Although it should be possible (in theory) to explicitly communicate the switching instant to the receiver modem, this is not generally practical. It is preferable for the modem to reliably detect the transient within the coherent tracking algorithms. The coherent tracking algorithms can be modified in the vicinity of the transient to provide approximately coherent tracking in the immediate vicinity of the transient, except for the symbol where the transient occurred. It is worth noting that the error in the noise variance estimate is due to the error in the coherent channel reference. Therefore the noise variance estimation need not be modified if the coherent channel reference is accurate.

"Blind" detection of the step transient due to switching of the antenna elements is required. The "blind" aspect of the detection refers to the method where the algorithm observes the demodulated modem symbols and does not have direct knowledge of the switching time initiated at the diversity switch module. The method involves processing of the smoothed coherent reference signal tracking samples (complex filtered values of α), which are labeled x in FIG. 12 and in this description, at the OFDM symbol rate (i.e., approx. 344.5 OFDM symbols/sec in one example). The complex channel gain values α are aggregated over all the reference subcarriers to produce one composite complex value of x for each OFDM symbol.

It is assumed that the transient (which can be approximately 30 microseconds duration) is much smaller than the symbol time and that this transient occurs during only one symbol. The symbols on either side of the transient are not significantly corrupted by the transient and can be used in the coherent tracking and estimation. However the symbols within half the FIR span (e.g., 5 samples for the 11-tap FIR filter, or 3 samples for a 7-tap FIR filter) away from the transient are affected by the filtering to estimate the coherent reference. This is clearly illustrated in FIG. 9 showing the complex real and imaginary components of x (solid plots) where the FIR filter was actually reduced from 11 taps to 7 taps in order to minimize the span of the transient effects. Reducing the FIR filter to 7 taps has the effect of slightly reducing the filter gain over noise, but improves the transient response.

FIG. 11 shows the distortion of the coherent tracking within ±3 symbols of the transient where the coherent reference is transitioning from the pre-transient value to the post-transient value for α. One method for detecting the transient involves hypotheses testing of the samples of x on either side of the symbol in question where a transient is to be detected. In other words, if a transient is to be detected at symbol location n, then we observe samples $x_{n-1}$ and $x_{n+1}$. This hypothesis testing continues for each successive symbol location and it is further assumed that observations of past and future samples of x are available through an appropriate delay in the signal processing algorithms which are adjusted later. It is also assumed that a transient is detected when the values of $x_{n-1}$ and $x_{n+1}$ are sufficiently different (or noncoherent). Several forms of detection for this difference have been analyzed, simulated and compared in a fading channel. The simple difference of the complex values $(x_{n-1} - x_{n+1})$, or the magnitude of this difference $|x_{n-1} - x_{n+1}|$, is insufficient to locate the transient since this difference is scaled by the magnitude of the signal at that instant and does not indicate the peak of the difference. However this difference can be inversely scaled by its magnitude after a peak is detected to test if a transient is present. Although various forms of the detection criteria can be effective, the squares of the magnitudes are used instead of the magnitude in this example to avoid the square root computation. The following 3-step algorithm to detect the location of a transient has shown to be effective in a noisy fading channel, and relatively simple to compute for a sequence of samples $x_n$.

$$diffsq_n = |x_{n+1} - x_{n-1}|^2$$

$$det\_peak_n = \begin{cases} 1; \text{if } (diffsq_n \geq diffsq_{n-1}) \wedge (diffsq_n \geq diffsq_{n+1}) \\ 0; \text{otherwise} \end{cases}$$

$$det\_transient_n = \begin{cases} 1; \text{if } \frac{diffsq_n}{|x_{n+1}|^2 + |x_{n-1}|^2} > thres \\ 0; \text{otherwise} \end{cases}$$

Figure 13:
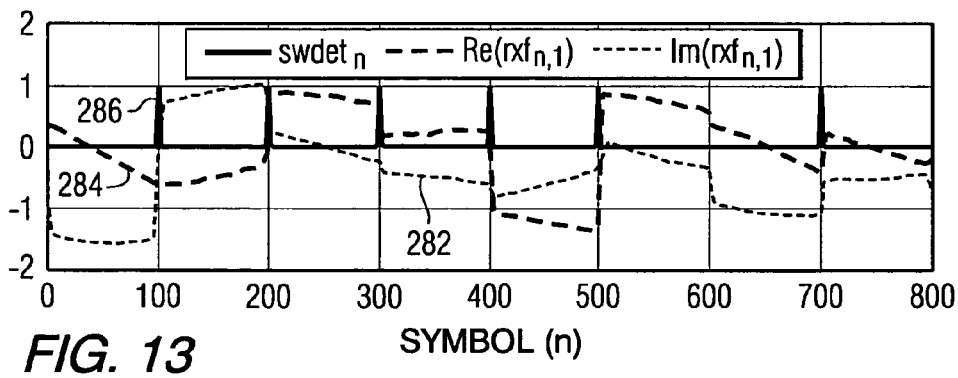
FIG. 13 is a plot showing the results of a transient detection algorithm.
Figure 14:
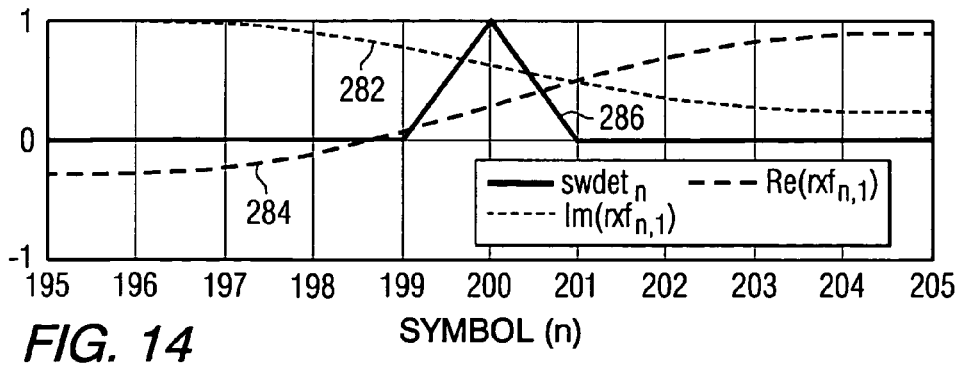
FIG. 14 is another plot showing the results of a transient detection algorithm.

Since the peak and transient detection expressions involve future values of x, it is convenient to compute diffsq one sample ahead of the next two expressions. A typical value for the thres is 0.05. An example of the transient detection output is shown in FIGS. 13 and 14. FIG. 13 shows the results of transient detection algorithm for 800 OFDM symbols. FIG. 14 shows the results of transient detection algorithm in the vicinity about symbol 200. These figures show the real 284 and imaginary 282 values of the filtered channel coherent reference α and the transient detection results showing impulses 286 at the detected transients. FIG. 14 magnifies the range about symbol 200. Notice that the transient was not detected at symbol 600 since the threshold is not sensitive to small differences across the transient which have minimal impact on performance. However the value of this threshold works well down to about 0 dB SNR.

Now that the transient can be reliably detected, the next step is to adjust the coherent reference samples α in the immediate vicinity of the transient. A relatively simple solution is to ignore the values of α close to the transient that include the symbol where the transient is detected. These values are replaced by the closest value of α which is unaffected by the FIR filter (4 samples from the transient for a 7-tap FIR filter). This yields the result of the dashed plots shown in FIG. 9. An example of the sequence in the vicinity of a detected transient is presented in Table 1. Table 1 shows the input values of ax and the corrected output values of α when a transient is detected at symbol location n. The input samples are sequenced as the symbols. But the corrected output sequence for α is adjusted to minimize the distortion due to the FIR filter as previously described.

detects transients in the composite coherent channel reference. The uncorrected coherent channel gains are then adjusted in the vicinity of the detected transient as shown in block 312. This produces corrected coherent channel gain for each reference subcarrier on lines 314, 316 and 318.

Analysis and simulation of the algorithm improvements appear to work sufficiently well for the cases analyzed and simulated. These cases include a flat and selective fading channel with Doppler bandwidth consistent with highway speeds and noise as low as 0 dB SNR. However other channel conditions should be considered. For example, impulsive-like noise may cause a false detection of a transient. In this case the adjusted coherent reference values of x are appropriate. However, the noise variance estimate would be corrupted. The noise impulse could be very high for the symbol(s) where the impulse occurred, but the IIR filter would suppress this noise estimate value at the impulse instant, and spread the noise estimate over the impulse response time of the IIR filter. It would be preferable in this case to feed-forward the high noise samples in parallel with the IIR path (with appropriate delay matching). For symbols where the noise pulse is sufficiently higher than the IIR filter

TABLE 1

Correction of complex channel gains α (for each reference subcarrier) in the vicinity of a detected transient at symbol location n.

| Symbol time | n − 5 | n − 4 | n − 3 | n − 2 | n − 1 | n | n + 1 | n + 2 | n + 3 | n + 4 | n + 5 |
|---|---|---|---|---|---|---|---|---|---|---|---|
| Detected transient (from x) | 0 | 0 | 0 | 0 | 0 | 1 | 0 | 0 | 0 | 0 | 0 |
| Smoothed input α | $\alpha_{n-5}$ | $\alpha_{n-4}$ | $\alpha_{n-3}$ | $\alpha_{n-2}$ | $\alpha_{n-1}$ | $\alpha_n$ | $\alpha_{n+1}$ | $\alpha_{n+2}$ | $\alpha_{n+3}$ | $\alpha_{n+4}$ | $\alpha_{n+5}$ |
| Corrected result α | $\alpha_{n-5}$ | $\alpha_{n-4}$ | $\alpha_{n-4}$ | $\alpha_{n-4}$ | $\alpha_{n-4}$ | $\frac{\alpha_{n-2} + \alpha_{n+4}}{2}$ | $\alpha_{n+4}$ | $\alpha_{n+4}$ | $\alpha_{n+4}$ | $\alpha_{n+4}$ | $\alpha_{n+5}$ |

A simple algorithm with appropriate logic and a buffer for the span of x samples can be used to achieve the results of Table 1. The operation is as follows for a 7-tap FIR filter used for α. When a transient is detected within 3 symbols ahead of the present symbol (e.g., n−3 through n−1), then use the value of $\alpha(\alpha_{n-4})$ which is 4 symbols ahead of the transient instead of using the present value of α. Similarly if the transient was detected within 3 past symbols (e.g., n+1 through n+3), then use the value of α ($\alpha_{n+4}$) which is 4 symbols after the transient instead of using the present value of α. If the present symbol is the location of a detected transient (e.g., n), then use the average of $\alpha_{of}$ samples which are ±4 symbols on either side of the transient $$\frac{\alpha_{n-4} + \alpha_{n+4}}{2}.$$

Figure 15:
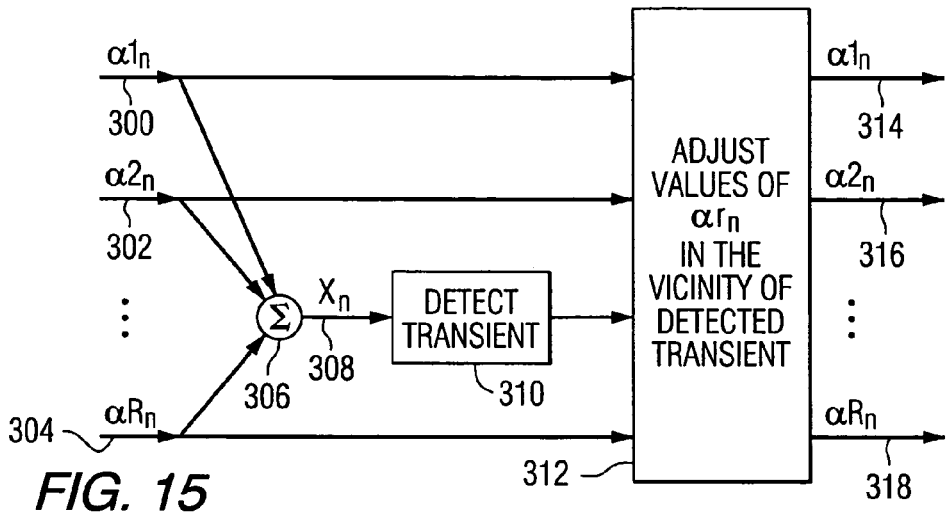
FIG. 15 is a functional block diagram illustrating the correction of coherent channel gains in the vicinity of a transient.
Figure 16:
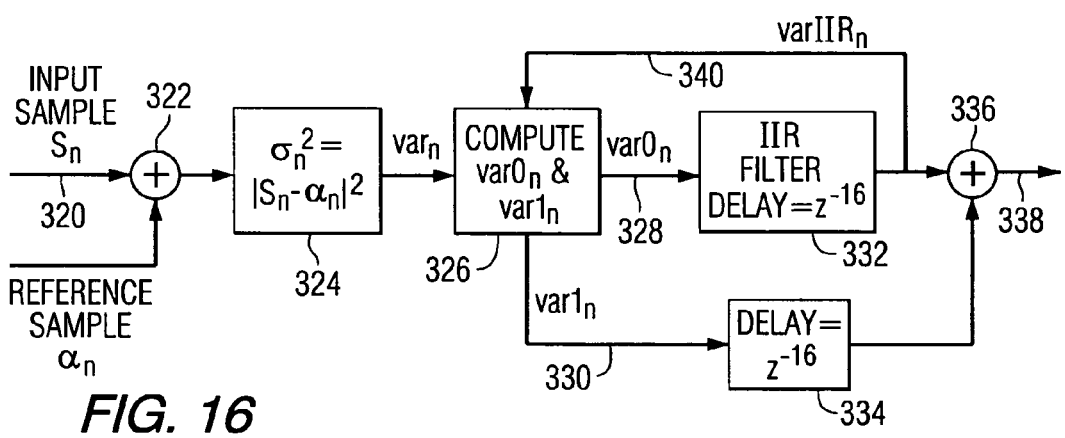
FIG. 16 is a block diagram illustrating a modification of the noise variance estimate.

Otherwise, use the present input values of α(e.g., n−5 through n−4, and n+4 through n+5). Of course the details of this algorithm can be adjusted to accommodate a different FIR filter span. A functional diagram showing the correction of the coherent channel gain values a in the vicinity of a detected transient is presented in FIG. 15. In FIG. 15, the uncorrected coherent channel gain for each subcarrier is input on lines 300, 302 and 304. These inputs are summed in summation point 306 to produce a composite coherent channel reference on line 308. A transient detector 310 output, this noise pulse should be used to determine the estimated noise variance for those symbols. When the feed-forward path is used for these noise pulses, the energy into the IIR filter for these samples should be reduced so that the local noise peak is not spread over the span of the IIR filter. It is easy to consider several variations of this process for handling noise peaks in the noise variance estimate. One such modification of the noise variance estimate to accommodate impulsive-like noise is presented in FIG. 16. In FIG. 16, inputs for each reference sample are supplied on line 320 and added to a reference sample $\alpha_n$ in adder 322. The noise variance samples are filtered across the reference subcarriers to reduce estimate errors as shown in block 324. The filtered variance samples are then used to compute the noise variance as shown in block 326. This results in variance $var0_n$ on line 328 (where $var0_n$=min $(2*varIIR_{n-1}+\epsilon, var_n)$), and $var1_n$ on line 3 $var1_n$=max $(0.0.5*var_n-varIIR_{n-1})$). The variance of $var0_n$ is then filtered in block 332 and $var1_n$ is delayed as illustrated by block 334. The filtered $var0_n$ and the delayed $var1_n$ are summed in adder 336 to produce a noise variance estimate output on line 338. The output $varIIR_n$ of filter 332 is fed back to block 324 on line 340.

The transient detection method described for antenna switching also works for impulsive noise. Unlike the transient switching case where the transient noise value happens to be small, the impulsive noise can be large. Also sometimes the switch transient goes undetected which causes the value of α to be in error (although small) but causes increased noise in the vicinity (±3 symbols), having a similar effect as impulsive noise. In these cases of impulsive-like noise, the noise variance estimation filters smooth the impulsive noise value over many symbols (e.g. 64) such that the noise at the impulsive instant is underestimated, while the noise within ±32 OFDM symbols is overestimated due to smearing of the noise sample. This causes degradation in the soft symbols fed to the Viterbi decoder. Therefore this adjustment can be added to the noise variance estimate to improve performance for these impulsive-like noise cases. The new noise variance estimate consists of the sum of the longer-term Gaussian-like noise variance and the short-term impulsive-like noise variance.

Referring to FIG. 16, the var0 value is the normal noise variance sample input to the IIR filter for subsequent estimation of the noise variance estimate. The var samples are sorted to represent normal gaussian-like squared noise samples (var0), and impulsive-like squared noise samples (var1). The IIR filter estimated the variance of the normal Gaussian noise, while the unfiltered delay path feeds forward the impulsive noise variance samples. When the noise samples var are within a reasonable range of the present IIR filter output, the value of var0 is set to var, and var1=0. When the noise value is unusually high (compared to the present filter output), then this is more likely an impulsive-like noise sample which shouldn't enter the long term filter. In this case the value of var0 is limited, while some of the excess value is placed in term var1. The value of var1 is appropriately delayed to match the IIR filter delay. The result is that the impulse noise samples are appropriately estimated at the proper instant, and this noise is not spread over many samples as depicted in FIG. 17, and improvement over the results in FIG. 11, where the impulsive noise is captured around symbol 600.

Figure 17:
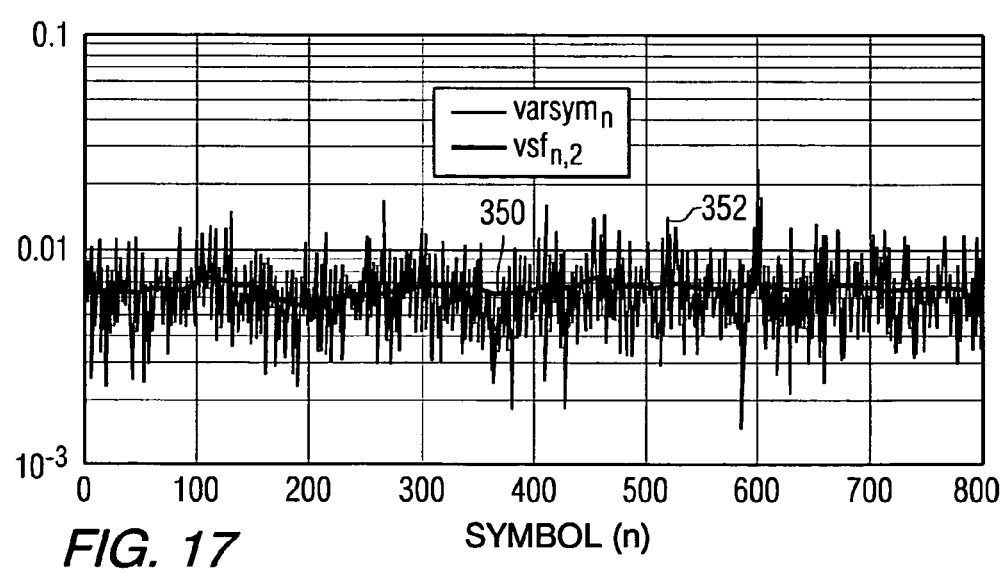
FIG. 17 is a plot showing the effects of switch transients on noise estimates.

FIG. 17 is a plot showing the effects of switch transients on the noise estimates (20 dB SNR) when noise variance modification is applied. Line 352 is the noise variance of the symbols, while line 354 is the filtered output. Notice that the missed transient at symbol location 600 is appropriately adjusted with the increased noise variance in the immediate vicinity of symbol 600.

Improvements to accommodate the switching transients encountered with the FM switch diversity antenna system for the FM Hybrid mode of IBOC HD Radio have been described above. These improvements involve the modification of the coherent tracking and noise variance estimation algorithms. The new algorithms were analyzed and simulated in flat and selective fading at typical highway speeds and Raleigh fading. The simulations show good tracking performance down to 0 dB SNR. The coherent tracking modification can also improve performance in the presence of impulsive-like noise. In addition, a modification to the noise variance estimation algorithm was suggested to further improve the performance in the presence of impulsive-like noise.

This invention also provides a method of estimating the noise variance of the symbols when the noise can include some impulsive-like samples among mostly Gaussian-like noise samples. A nonlinear filtering of the squares of the error samples, where the nonlinear filtering technique comprises the steps of: computing the squares of the error samples between the coherent reference values and the new symbol values; and using a nonlinear filtering technique where normal Gaussian-like noise samples (squared) are passed through a filter (e.g. FIR or IIR filter) to estimate the Gaussian-like noise variance, while the impulsive-like noise samples (squared) are added (after appropriate delay to match filter delay) to the filter output to produce a new noise variance representing the sum of the longer-term-averaged Gaussian-like noise variance, and the short-term impulsive noise variance.

The method can further include the sorting of Gaussian-like squared noise samples and impulsive-like noise samples; determining if each new input noise (squared) sample is impulsive-like by comparing the sample to some multiple of the present average noise variance estimate output of the filter (plus a constant to accommodate step transients); and if the noise squared sample is not determined to be impulsive-like, then input this value to the filter to be used to estimate the long-term Gaussian-like noise variance.

This invention provides improvements to the coherent tracking algorithms which are used autonomously with a blind switch diversity antenna system. These same improvements can also mitigate degradation due to impulsive noise or nongaussian noise such as from an adjacent FM analog interferer.

While this invention has been described in terms of several embodiments, it will be apparent to those skilled in the art the various changes can be made to the disclosed embodiments without departing from the scope of the invention as set forth in the claims.

What is claimed is:

1. A method for coherently tracking a radio signal including at least one digitally modulated reference carrier, the method comprising the steps of:
   demodulating the reference carrier to produce complex coherent reference gains;
   detecting a transient that affects the complex coherent reference gains; and
   adjusting the complex coherent reference gains in the vicinity of the transient to produce adjusted complex coherent reference gains.

2. The method of claim 1, further comprising the step of:
   using a plurality of antenna elements to receive the radio signal, wherein the transient is caused by switching among the antenna elements.

3. The method of claim 1, wherein the transient is impulsive noise.

4. The method of claim 1, wherein the step of adjusting the complex coherent reference gains in the vicinity of the transient comprises the step of:
   substituting a previous or future complex coherent reference gain value for the complex coherent reference gain in the vicinity of the transient.

5. The method of claim 1, wherein the step of adjusting the complex coherent reference gains in the vicinity of the transient comprises the steps of:
   filtering the complex coherent reference gains to produce smoothed complex coherent reference gains; and
   processing the smoothed complex coherent reference gains to ignore values of the complex coherent reference gains closest to the transient and replacing the values of the complex coherent reference gains closest to the transient with the closest value of the complex coherent reference gains that are unaffected by a filter.

6. The method of claim 1, wherein the radio signal comprises a plurality of reference subcarriers, and wherein the complex coherent reference gains in the vicinity of the transient are adjusted for each of the reference subcarriers.

7. The method of claim 1, wherein the step of detecting a transient that affects the complex coherent reference gains comprises the steps of:

processing the complex coherent reference gains for a plurality of reference subcarriers; and aggregating the complex coherent reference gains over all the reference subcarriers to produce one composite coherent channel reference signal for each OFDM symbol.

8. The method of claim 1, wherein the step of detecting a transient that affects the complex coherent reference gains comprises the steps of:

calculating a magnitude of a difference of a plurality of composite coherent channel reference signals;

determining if the magnitude is a local peak; and if the magnitude is a local peak, then inversely scaling the magnitude by the sum of the magnitude of the difference.

9. The method of claim 1, wherein the step of detecting a transient that affects the complex coherent reference gains comprises the steps of:

computing a sequence of samples $x_n$ from the complex coherent reference gains;

computing a square of the difference ($diffsq_n$) between samples $x_{n+1}$ and $x_{n-1}$;

setting a peak detection variable ($detpeak_n$) equal to one if ($diffsq_n \geq diffsq_{n-1}$) or if($diffsq_n \geq diffsq_{n+1}$), otherwise setting the peak detection variable to 0; and indicating the presence of a transient if $$\frac{diffsq_n}{|x_{n+1}|^2 + |x_{n-1}|^2}$$

is greater than a predetermined threshold value.

10. The method of claim 1, wherein the step of adjusting the complex coherent reference gains in the vicinity of the transient comprises the steps of:

ignoring values ($\alpha$) of the complex coherent reference gains close to the transient that include a symbol where the transient is detected; and replacing the ignored values of $\alpha$ by the closest value of $\alpha$ which is unaffected by a filter used to estimate $\alpha$.

11. The method of claim 1, wherein the step of adjusting the complex coherent reference gains in the vicinity of the transient comprises the steps of:

if a corrupted value ($\alpha$) of the complex coherent reference gain is detected within 3 symbols ahead of a present symbol, then using a value of $\alpha$ ($\alpha_{n-4}$), which is 4 symbols ahead of the transient instead of using a present value of $\alpha$;

if the corrupted value ($\alpha$) of the complex coherent reference gain is detected within 3 past symbols, then using a value of $\alpha$ ($\alpha_{n+4}$) which is 4 symbols after the transient instead of using the present value of $\alpha$;

if the corrupted value ($\alpha$) of the complex coherent reference gain is at a location of a presently detected symbol, then using an average of $\alpha$ of samples which are ±4 symbols on either side of the transient $$\frac{\alpha_{n-4} + \alpha_{n+4}}{2};$$

and if the corrupted value ($\alpha$) of the complex coherent reference gain is not detected, then using the present input values of $\alpha$.

12. A receiver for coherently tracking a radio signal including at least one digitally modulated reference carrier, the receiver comprising:

an input for receiving the radio signal; and a processor for demodulating the reference carrier to produce complex coherent reference gains, for detecting a transient that affects the complex coherent reference gains, and for adjusting the complex coherent reference gains in the vicinity of the transient to produce adjusted complex coherent reference gains.

13. The receiver of claim 12, further comprising:

a plurality of antenna elements coupled to the input, wherein the transient is caused by switching among the antenna elements.

14. The receiver of claim 12, wherein the transient is impulsive noise.

15. The receiver of claim 12, wherein the processor substitutes a previous or future complex coherent reference gain value for the complex coherent reference gain in the vicinity of the transient.

16. The receiver of claim 12, wherein the processor filters the complex coherent reference gains to produce smoothed complex coherent reference gains, and processes the smoothed complex coherent reference gains to ignore values of the complex coherent reference gains closest to the transient and replace the values of the complex coherent reference gains closest to the transient with the closest value of the complex coherent reference gains that are unaffected by a filter.

17. The receiver of claim 12, wherein the radio signal comprises a plurality of reference subcarriers, and wherein the complex coherent reference gains in the vicinity of the transient are adjusted for each of the reference subcarriers.

18. The receiver of claim 12, wherein the processor processes the complex coherent reference gains for a plurality of reference subcarriers and aggregates the complex coherent reference gains over all the reference subcarriers to produce one composite coherent channel reference signal for each OFDM symbol.

19. The receiver of claim 12, wherein the processor calculates a magnitude of a difference of a plurality of composite coherent channel reference signals; determines if the magnitude is a local peak; and if the magnitude is a local peak, then inversely scales the magnitude by the sum of the magnitude of the difference.

20. The method of claim 12, wherein the processor receives a sequence of samples $x_n$; computes a square of the difference ($diffsq_n$) between samples $x_{n+1}$ and $x_{n-1}$; sets a peak detection variable ($detpeak_n$) equal to one if ($diffsq_n \geq diffsq_{n-1}$) or if ($diffsq_n \geq diffsq_{n+1}$), otherwise setting the peak detection variable to 0; and indicates the presence of a transient if $$\frac{diffsq_n}{|x_{n+1}|^2 + |x_{n-1}|^2}$$

is greater than a predetermined threshold value.

21. The receiver of claim 12, wherein the processor ignores values ($\alpha$) of the complex coherent reference gains close to the transient that include a symbol where the transient is detected; and replaces the ignored values of $\alpha$ by the closest value of $\alpha$ which is unaffected by a filter used to estimate $\alpha$.

22. The receiver of claim 12, wherein:

if a corrupted value ($\alpha$) of the complex coherent reference gain is detected within 3 symbols ahead of a present symbol, then using a value of $\alpha$ ($\alpha_{n-4}$), which is 4 symbols ahead of the transient instead of using a present value of $\alpha$;

if the corrupted value ($\alpha$) of the complex coherent reference gain is detected within 3 past symbols, then using a value of $\alpha$ ($\alpha_{+4}$), which is 4 symbols after the transient instead of using the present value of $\alpha$;

if the corrupted value ($\alpha$) of the complex coherent reference gain is at a location of a presently detected symbol, then using an average of $\alpha$ of samples which are ±4 symbols on either side of the transient $$\frac{\alpha_{n-4} + \alpha_{n+4}}{2};$$

and if the corrupted value ($\alpha$) of the complex coherent reference gain is not detected, then using the present input values of $\alpha$.

23. A receiver for coherently tracking a radio signal including at least one digitally modulated reference carrier, the receiver comprising:

an input for receiving the radio signal; and means for demodulating the reference carrier to produce complex coherent reference gains, for detecting a transient that affects the complex coherent reference gains, and for adjusting the complex coherent reference gains in the vicinity of the transient to produce adjusted complex coherent reference gains.

24. The receiver of claim 23, further comprising:

a plurality of antenna elements coupled to the input, wherein the transient is caused by switching among the antenna elements.

25. The receiver of claim 23, wherein the transient is impulsive noise.

* * * * *

UNITED STATES PATENT AND TRADEMARK OFFICE
CERTIFICATE OF CORRECTION

PATENT NO. : 7,305,056 B2
APPLICATION NO. : 10/715582
DATED : December 4, 2007
INVENTOR(S) : Brian William Kroeger Page 1 of 1

It is certified that error appears in the above-identified patent and that said Letters Patent is hereby corrected as shown below:

Column 8, Line 9
$y_{n,m}=2\cdot(1-\beta)\cdot y_{n-1,m}-(1-\beta)^2\cdot y_{n-2,m}+\beta^2\cdot x$ should read "$y_{n,m}=2\cdot(1-\beta)\cdot y_{n-1,m}-(1-\beta)^2\cdot y_{n-2,m}+\beta^2\cdot x_{n,m}$"

Column 9, Line 21 should read
"…estimate of the coherent reference gain $\underline{\alpha}$ for each QPSK…"

Column 11, Line 9 should read
"…locally to the transient, but…"

Column 13, Line 18 should read
"Table 1 shows the input values of $\underline{\alpha}$ and…."

Column 13, Table 1
Corrected result α

| $\alpha_{n-5}$ | $\alpha_{n-4}$ | $\alpha_{n-4}$ | $\alpha_{n-4}$ | $\alpha_{n-4}$ | $\dfrac{\alpha_{n-2}+\alpha_{n+4}}{2}$ | $\alpha_{n+4}$ | $\alpha_{n+4}$ | $\alpha_{n+4}$ | $\alpha_{n+4}$ | $\alpha_{n+5}$ | should read

| "$\alpha_{n-5}$ | $\alpha_{n-4}$ | $\alpha_{n-4}$ | $\alpha_{n-4}$ | $\alpha_{n-4}$ | $\dfrac{\alpha_{n-4}+\alpha_{n+4}}{2}$ | $\alpha_{n+4}$ | $\alpha_{n+4}$ | $\alpha_{n+4}$ | $\alpha_{n+4}$ | $\alpha_{n+5}$" |

Column 13, Line 62 should read
"…channel gain values $\underline{\alpha}$ in the vicinity…."

Column 14, Line 56 should read
"…and $var1_n$ on line $\underline{330}$ $var1_n$=max…"

Signed and Sealed this

Ninth Day of December, 2008

JON W. DUDAS
*Director of the United States Patent and Trademark Office*